United States Patent [19]

Sawyer et al.

[11] Patent Number: 5,062,192
[45] Date of Patent: Nov. 5, 1991

[54] CABLE STRIPPING TOOL

[75] Inventors: Alan G. Sawyer, 6346 Beulah Church Rd., Liberty, N.C. 27298; Dale L. Hughes, 1505 McCuiston Dr., Burlington, N.C. 27215; Edwyn H. Petree, Burlington, N.C.

[73] Assignees: Alan G. Sawyer, Liberty; Dale L. Hughes, Burlington, both of N.C.

[21] Appl. No.: 649,671

[22] Filed: Feb. 1, 1991

Related U.S. Application Data

[62] Division of Ser. No. 399,744, Aug. 28, 1989, Pat. No. 5,009,006.

[51] Int. Cl.⁵ .............................................. H02G 1/12
[52] U.S. Cl. .................................... 29/426.4; 30/90.6; 81/9.41
[58] Field of Search ...................... 30/90.6, 90.8, 91.2, 30/90.4; 81/9.41, 9.51; 29/857, 825, 426.1, 426.4, 426.6

[56] References Cited

U.S. PATENT DOCUMENTS

| | | | |
|---|---|---|---|
| 785,392 | 3/1905 | Williams | 30/90.6 |
| 1,857,731 | 5/1932 | Lund | 30/90.6 |
| 3,237,300 | 3/1966 | Townsend et al. | 30/90.6 |
| 3,696,509 | 10/1972 | Lancaster | 30/90.6 |
| 4,117,749 | 10/1978 | Economu | 30/90.6 |
| 4,447,949 | 5/1984 | Kane | 30/90.6 |
| 4,738,027 | 4/1988 | Bermier, Jr. et al. | 30/90.6 |

FOREIGN PATENT DOCUMENTS

| | | | |
|---|---|---|---|
| 955330 | 1/1957 | Fed. Rep. of Germany | 30/90.6 |
| 975476 | 11/1964 | United Kingdom | 30/90.6 |

Primary Examiner—Douglas D. Watts
Assistant Examiner—Rinaldi Rada
Attorney, Agent, or Firm—Rhodes, Coats & Bennett

[57] ABSTRACT

A hand tool suitable for cutting the insulation jacket on "Romex"-type cables. The tool is adapted to cut the insulation jacket crosswise and lengthwise so that the cable sheath may be removed with a slight pull. The tool includes a pair of handles which are hinged at one end. The opposite end of one of the handles includes a pair of blades which are spaced apart and which "slice" across the cable sheath and then pass clear the cable when the handles are squeezed together. A pair of slitting blades located within the handles engage the insulation on the remaining opposite sides of the cable. The tool is then drawn down the length of the cable away from the original cut to complete the operation.

3 Claims, 3 Drawing Sheets

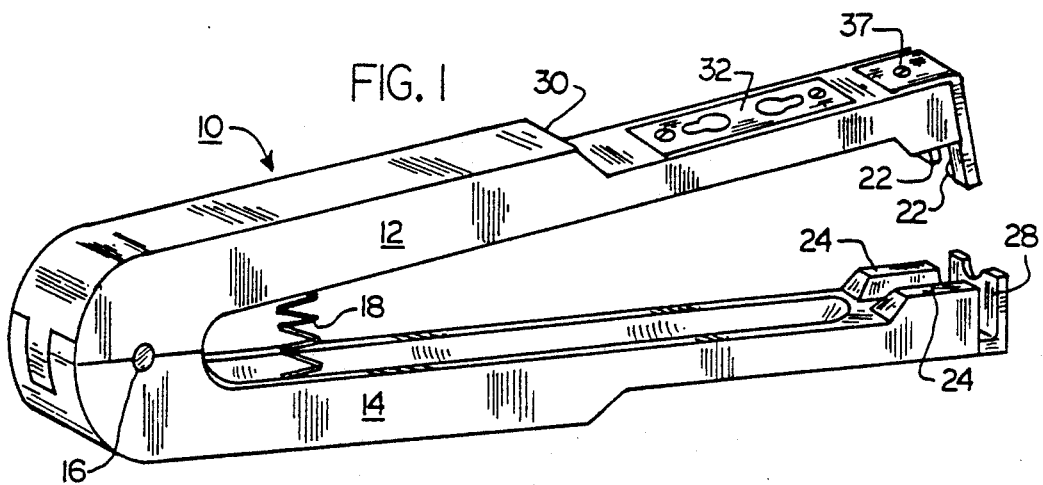
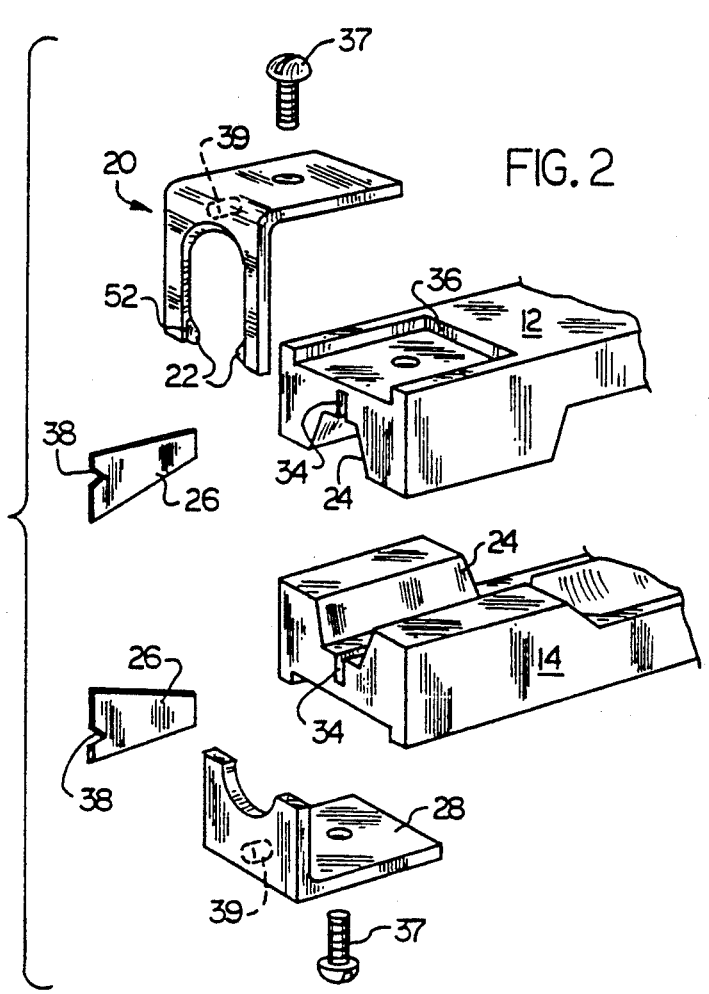
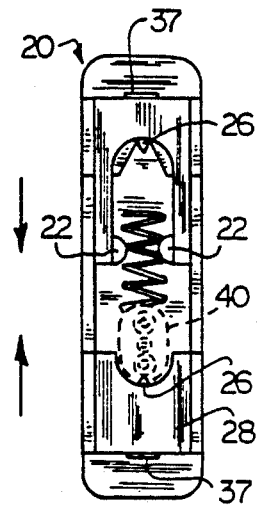
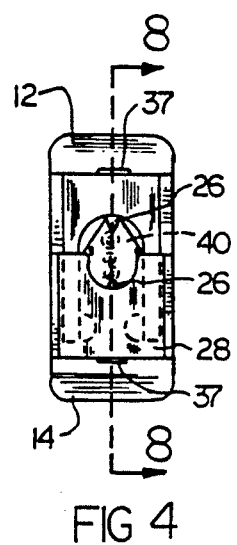

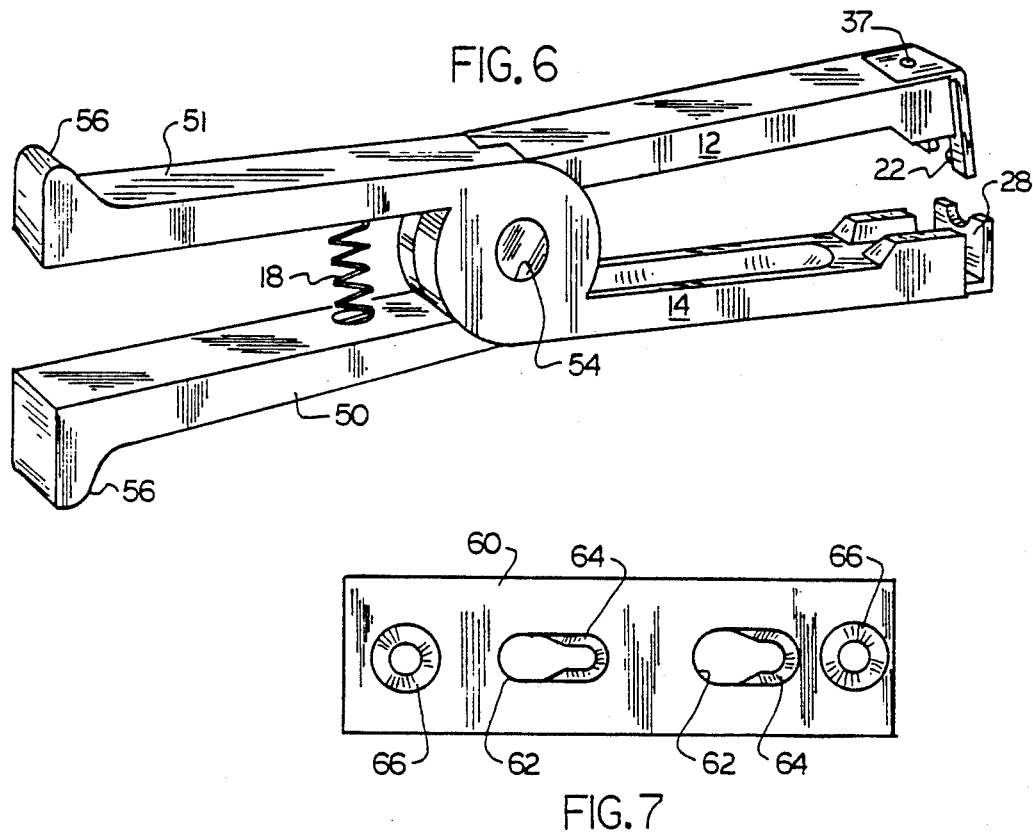
FIG. 6
FIG. 7
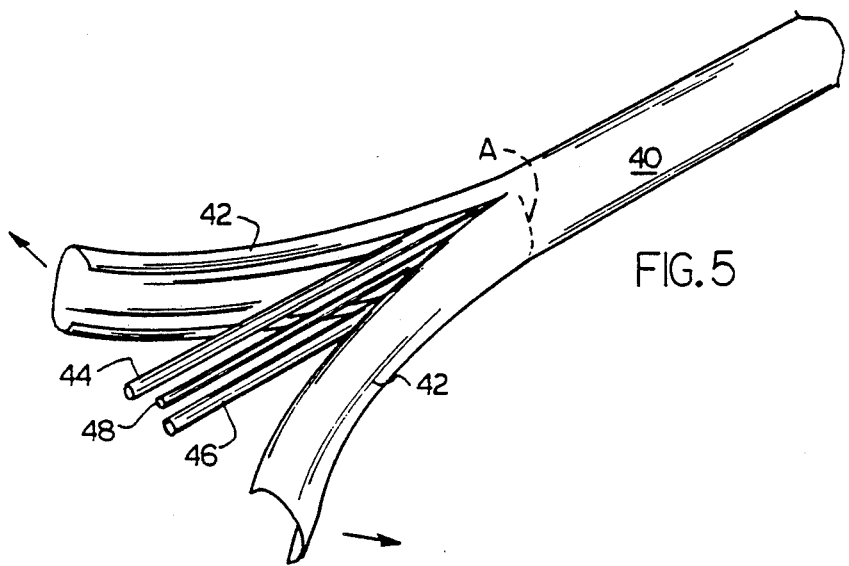
FIG. 5

CABLE STRIPPING TOOL

This application is a division, of application Ser. No. 399,744, filed Aug. 28, 1989 now U.S. Pat. No. 5,009,006.

BACKGROUND OF THE INVENTION

1) Field of the Invention

The present invention relates generally to hand tools and, in particular, to a new and novel cable stripping tool.

2) Description of the Prior Art

It is the general practice in the construction industry to strip insulation from electrical cables and wires by cutting or scraping usually with a pocket knife. However, in cables having an outer plastic sheath and two or more insulated, stranded or solid wires, there is a danger of knicking or otherwise damaging the insulation on the inner wires. This method is slow and time-consuming, requires a certain degree of skill before becoming proficient, and often results in irritating cuts to the user's fingers. In addition, this method is even more difficult when there is a need to strip a cable inside of confined spaces, such as light switch and receptacle boxes.

U.S. Pat. No. 2,054,973 to Ferguson discloses a tool for stripping insulation from electrical wires. The Ferguson tool is a plier-like tool which allows an increase in the mechanical advantage over a simple handle-type. A first cut is made in the insulation surrounding the stranded or solid wire with the semi-circular cutting edges of a pair of opposed circular cutters. The cutters then stay in contact with the insulation as the tool is drawn away from the cut to strip the insulation from the wire. This has a tendency to "bunch up" the insulation, thereby increasing the amount of force necessary to remove the insulation. This can result in damage to the stranded or solid wire. In the preferred embodiment, the Ferguson tool includes a pair of side-slitting blades which have a tapered lead-in for slitting the sides of the insulation.

U.S. Pat. No. 4,594,921 to Ishmael discloses a coaxial cable stripping tool in which a pair of blade-shaped heating elements are clamped against opposite sides of the cable and the cable rotated to form a circumferential cut in the insulation. The cable is then placed in another jig with a V-shaped groove therein and a second blade-shaped heating element at the bottom of the groove. A second similar heating element is arranged above the groove in the cable. The two heating elements then produce diametrically opposed longitudinal cuts in the insulation, after which the two pieces of cable insulation can be removed. The circumferential cut requires that the cable and tool be rotated with respect to one another. In addition, the cable must be physically removed from the jig before the blades are free of the conductors.

The Kaufman patent (U.S. Pat. No. 3,881,248), Bradley patent (U.S. Pat. No. 3,180,184), and Sibley patent (U.S. Pat. No. 698,567) are all examples of other cross-cutter type stripping tools. However, like the above patents, all these patents teach a "chopping-cutting arrangement in which, after cutting opposite sides of the conductor, the blades remain in contact with the insulation while the insulation is removed. Furthermore, this cutting arrangement requires a different opening size for each size cable in order to prevent damage to the wires inside the cable.

It has thus become desirable to develop a cable stripping tool that will easily remove the outer plastic sheath of the cable in a confined space such as a light switch box while, at the same time, prevent damage to insulation on the inner stranded or solid wire by either bunching up the insulation or otherwise stressing the inner stranded or solid wires such as by conventional "chopping" type strippers. Furthermore, the tool should be able to cut more than one side of cable without damaging the wires inside the cable.

SUMMARY OF THE INVENTION

The present invention solves the aforementioned problems associated with the prior art by providing a hand tool suitable for cutting the insulation jacket on "Romex"-type cables which is adapted to cut crosswise and lengthwise so that the cable sheath may be removed with a slight pull after using the tool. The tool includes a pair of handles Which are hinged at one end and biased outwardly by a spring. The opposite end of one of the handles includes a pair of blades which are spaced apart and which "slice" across the cable sheath When the handles are squeezed together. Thus, in operation, the cable is first positioned between a pair of opposed guides adjacent to the blades at a point where the cable sheath is to be removed. The handles are then squeezed together with one hand which makes tangential slices on the opposite sides of the insulation perpendicular to the length of the cable. The pair of blades are substantially rigidly mounted but are somewhat flexible With respect to one another, thereby permitting the tool to be used on more than one cable size. After making these cuts, the slicing blades continue and pass clear the cable.

In the preferred embodiment, a pair of slitting blades located within each of the guides engage the insulation on the remaining opposite sides. The tool is then drawn down the length of the cable away from the original cut to complete the operation. Thus, the present tool eliminates the worry of cutting hands or fingers with the conventional knives or blades while eliminating damage to the stranded or solid wires caused by bunching or otherwise stressing the inner stranded or solid wires.

Accordingly, one aspect of the invention is to provide a tool for stripping insulation or sheathing from a cable having at least one conductor. The tool includes a pair of jaws adapted to move from an open position to a closed position, means for scoring the insulation or sheathing on opposite sides, and a pair of oppositely mounted cutting blades. The blades are removably mounted to the jaws along the longitudinal axis of the cable and adjacent to the cable and are adapted to make longitudinal slits in the insulation or sheathing of the cable when the jaws are closed.

Another aspect of the present invention is to provide a cutting assembly for a tool for stripping insulation or sheathing from a cable. The assembly includes a pair of opposed, substantially rigidly mounted cutting blades which are mounted at a predetermined distance with respect to one another. The assembly also includes means for moving the pair of opposed, substantially rigidly mounting cutting blades from an open position to a position where the blades are moved in tangential path, contacting opposite sides of the cable, continuing through at least a portion thereof, and passing clear of the cable, thereby scoring the insulation or sheathing on opposite sides.

Still another aspect of the present invention is to provide a hand tool for stripping insulation or sheathing from a cable having at least one conductor. The tool includes a pair of jaws adapted to move from an open position to a closed position, a pair of oppositely mounted cutting blades removably mounted to the jaws along the longitudinal axis of the cable and adjacent to the cable which are adapted to make longitudinal cuts in the insulation or sheathing of the cable when the pair of jaws are closed, a pair of opposed, substantially rigidly mounted cutting blades which are mounted at a predetermined distance With respect to one another, and means for moving the pair of opposed, substantially rigidly mounted cutting blades from an open position to a position where the blades are moved in a tangential path, contacting opposite sides of the cable, continuing through at least a portion thereof, and passing clear of the cable.

These and other aspects of the present invention will be more clearly understood after review of the following description of the preferred embodiment of the invention when considered along with the drawings.

BRIEF DESCRIPTION OF THE DRAWINGS

FIG. 1 is a perspective view of a cable stripping hand tool in accordance with the present invention.

FIG. 2 is an enlarged exploded perspective view of the jaw assembly of the hand tool shown in FIG. 1.

FIGS. 3 and 4 are end views illustrating the operation of the hand tool of FIG. 1.

FIG. 5 illustrates how the outer insulating cable sheath can be easily removed after being sliced and slit by the hand tool in FIG. 1.

FIG. 6 is a perspective view of an alternative embodiment of a hand tool according to the present invention.

FIG. 7 is an enlarged top view of the wire stripper shown in FIG. 1.

DESCRIPTION OF THE PREFERRED EMBODIMENT

Figure 8:
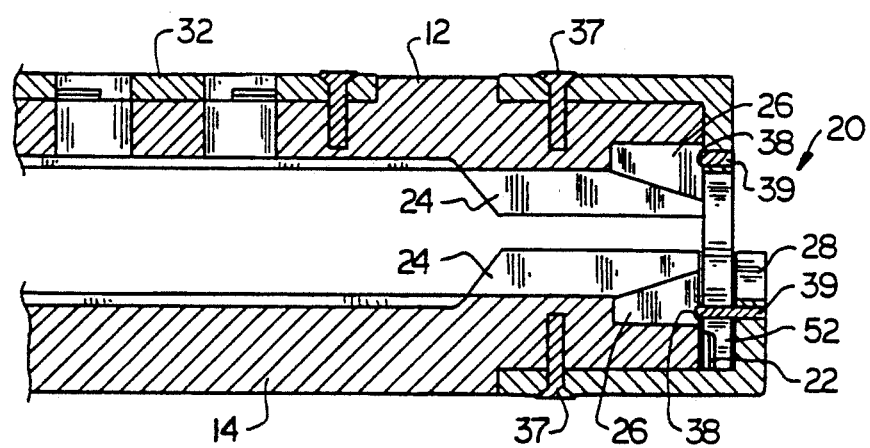
FIG. 8 is an enlarged sectional view taken along line 8—8 of FIG. 4 illustrating the slicing blade arrangement.

Referring now to the drawings in general and to FIG. 1 in particular, it will be understood that the illustrations are for the purpose of describing a preferred embodiment of the invention and are not intended to limit the invention thereto. As best seen in FIG. 1, a cable stripper, generally designated 10, is shown in accordance with the present invention. Cable stripper 10 somewhat resembles a pair of ice tongs, includes a pair of handles which are formed into jaws 12 and 14. Jaws 12, 14 are connected at one end by means of a pivot joint 16 and are biased apart by spring 18. Construction of pivot joints 16 is such as to permit the jaws to swing partially open but only so and an inoperative position with respect to a cable (not shown). Cable stripper 10 includes a slicing means 20 having a pair of opposed blades 22 and spaced apart a predetermined amount with respect to one another depending on the size of the cable which is being utilized In addition, each jaw 12, 14 includes a pair of U-shaped guide grooves 24 for receiving and positioning the cable. Guides 24 include a pair of opposed slitting blades 26 located adjacent to and transverse to guides 24. Attachment means 37 secure the slicing means 20 and a blade guard 28 to jaws 12, 14 and permit their removal and replacement. Jaws 12, 14 include an abutment portion 30 located towards pivot joint 16 for preventing the operator's hand from slipping when the tool is utilized. In the preferred embodiment, a portion of one of jaws 12, 14 also includes a stripping means 32 for removing the insulation of the inner stranded or solid wires after the outer layer of the cable has been stripped.

As used herein, "slicing" refers to cuts made in the sheath of the cable perpendicular to the axis of the cable; "slitting" refers to cuts made in the sheath which runs along the axis of the cable; and "stripping" refers to the process of removing the outer insulating sheath from the cable. As used herein, a cable is defined as having a plurality of individual strands or solid wires, at least some of which have an outer layer of insulation and which the entire bundle of wires are surrounded by a outer insulating sheath or jacket.

Turning now to FIG. 2, there is shown an enlarged exploded perspective view of the jaw assembly of the hand tool shown in FIG. 1. Each of jaws 12, 14 include a slit 34 aligned along the longitudinal axis of jaws 12, 14 and adapted to receive slitting blades 26. Jaws 12, 14 include U-shaped abutments 36 which butts against three sides of slicing means 20 and guard 28 and, in combination with attachment means 37, prevents any movement of the assemblies With respect to the jaws. The relative dimensions of the guard 28 and slicing means 20 are such as to prevent the removal of slitting blades 26 from slits 34 after assembly. In the preferred embodiment, slitting blades 26 also each include a notch 38 located along the length of blade 26 and adapted to receive end of pin means 39 when the stripper 10 is assembled, thereby further interlocking the assemblies.

As can be best seen in FIGS. 3 and 4, there is shown the operation of the hand tool of FIG. 1 removing the outer insulating sheath from a "Romex"-type cable 40 having a pair of insulated leads 44, 46 and a grounding wire 48. As can be seen, slitting blades 22 cut tangentially along opposite surfaces of cable 40 as the jaws 12, 14 of tool 10 are squeezed together. Guides 24 positions and prevents the downward movement of cable 40. In the preferred embodiment, abutments 52 contact the surface of cable 40 and limit the cutting depth of slicing blades 22, thereby allowing different cable sizes to be cut with the same blades. Once slicing blades 22 have cut across cable 40 and continue and past clear of cable 40, slitting blades 26 also engage the surface of the sheath 42 of cable 40 and cut thereinto with jaws 12, 14 held together, the user then pulls tool 10 along the remaining length of cable 40 causing slitters 26 to penetrate the outer plastic insulating sheath 42 of the cable 40. However, as discussed above, slicing blades 22 are no longer in contact with the surface of the cable 40, thereby preventing bunching of the insulation.

As best seen in FIG. 5, a sliced and slit outer insulating sheath 42 is shown of cable 40 after the operation of tool 10 in accordance with the present invention. As shown, the outer insulating sheath 42 is still attached to the main cable body 40 along portions designated "A". However, the area "A" represents a relatively small portion of the outer insulation sheath 42 and the excess portions of the sheath can be easily removed by pulling firmly or simply pulled back out the way.

Turning now to FIG. 6, there is shown a perspective view of an alternative embodiment of a hand tool in accordance with the present invention. While the operation of this tool is essentially the same as described above, in the tool shown as FIG. 6 jaws 14 are extended to form handles 50, 51, respectively. A plier-type pivot joint 54 is located towards cutting blades 22, 26, thereby increasing the mechanical advantage which the user can assert when stripping cable 40. In addition, the ends of handles 50, 51 are turned upward and outward to form a pair of abutments 56 for preventing the slippage of user's hand when the tool is operated.

As best seen in FIG. 7, the tool 10 may include a stripping means 32 which can be utilized to remove the insulation from the insulated leads 44, 46. Stripping means 32 includes a flat plate 60 having a pair of keyhole-shaped openings 62. The larger portion of the keyhole-shaped openings 62 is sized to receive the insulated leads 42, 44. The smaller portion of the keyhole-shaped openings 62 includes a blade surface 64 which is sized to cut through the insulation of conductors 42, 44 but not to damage the inner stranded or solid wire. A pair of openings 66 permit the attachment of stripping means 32 to either of jaws 12, 14 and permit its removal and replacement as needed.

Finally, turning to FIG. 8, an enlarged sectional view of the slicing blades is shown As discussed above, in the preferred embodiment, each slicing blade 22 includes an abutment 52 adjacent to the blade and set back from the top of each blade 22. During the slicing operation, abutments 52 contact the surface of cable 40 and limit the cutting depth of slicing blades 22, thereby allowing difference cable sizes to be cut with the same blades. As can also be seen, guard 28, guides 24 and slicing means 20 cooperate together to prevent cutting hands or fingers and damage to the blades.

Certain modifications and improvements will occur to those skilled in the art upon reading of the foregoing description. By way of example, the ends of the jaws of the tool could be offset with respect to tool body to provide additional clearance with respect to the cable which permits the insulation from a relatively stiff cable to be removed more easily. It should be understood that all such modifications and improvements have been deleted herein for the sake of conciseness and readability but are properly within the scope of the following claims.

We claim:

1. A method for stripping insulation or sheathing from a cable having at least one conductor, comprising the step of, seriatim:
   (a) moving a pair of opposed, substantially rigidly mounted cutting blades in a tangential path with respect to the cable, said blades being mounted at a predetermined distance with respect to one another;
   (b) contacting opposite sides of the cable;
   (c) continuing through at least a portion thereof of the insulation or sheathing, thereby scoring the insulation or sheathing on opposite sides;
   (d) passing the cutting blades clear of the cable;
   (e) making longitudinal cuts in the insulation or sheathing of the cable; and
   (f) removing the insulation or sheathing from the cable.

2. A method for stripping insulation or sheathing from a cable having at least one conductor by means of a pair of cutting blades, comprising the steps of:
   (a) contacting opposite sides of the cable, continuing through at least a portion thereof of the insulation or sheathing, and passing clear of the cable, thereby scoring the insulation or sheathing on opposite sides;
   (b) making longitudinal cuts in the insulation or sheathing of the cable; and
   (c) removing the insulation or sheathing from the cable.

3. A method for stripping insulation or sheathing from a cable having at least one conductor, comprising the steps of, seriatim:
   (a) moving a pair of opposed, substantially rigidly mounted cutting blades in a tangential path with respect to the cable, said blades being mounted at a predetermined distance with respect to one another;
   (b) contacting opposite sides of the cable;
   (c) continuing through at least a portion thereof of the insulation or sheathing, thereby scoring the insulation or sheathing on opposite sides;
   (d) passing the cutting blades clear of the cable; and
   (e) removing the insulation or sheathing from the cable.

* * * * *